Patented June 20, 1950

2,512,293

UNITED STATES PATENT OFFICE 2,512,293

SUBSTITUTED ETHYLENEDIAMINES AND PROCESS FOR PREPARING SAME

Mitchell F. Zienty, Elkhart, Ind., assignor to Sumner Chemical Company, Inc., Zeeland, Mich., a corporation of Michigan No Drawing. Application March 14, 1949, Serial No. 81,398

11 Claims. (Cl. 260—296)

This invention relates to a new group of compounds having the general formula as follows, and salts thereof:

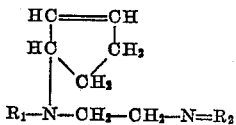

where $R_1$ is a radical selected from the group consisting of pyridyl and phenyl, and $R_2$ is selected from the group consisting of dimethyl, diethyl, methyl ethyl, and the cyclic (—CH$_2$—CH$_2$—CH$_2$—CH$_2$—)

forming the pyrrolidine ring.

The novel compounds of the present invention are characterized by their excellent anti-histaminic properties combined with non-toxicity, and may be used in suitable preparations for either parenteral or subcutaneous administration.

The principal member of this group is N,N-dimethyl - N'-($\Delta^2$-cyclopentenyl) - N'-($\alpha$-pyridyl) - ethylenediamine which may be prepared, generally, by reacting an alkali salt, such as the lithium salt, of N,N-dimethyl-N'-($\alpha$-pyridyl)-ethylenediamine in benzene suspension with $\Delta^2$-cyclopentenyl chloride. As a specific disclosure of the method of making the primary compound of this group, the following is given:

Example 1

To a suspension of 7 grams of lithium amide in 500 cc. of dry benzene was added 49.2 grams of N,N - dimethyl - N'-($\alpha$-pyridyl)-ethylenediamine, and the mixture stirred and refluxed for three hours. The reaction mass was then cooled to 25° C., and while this temperature was maintained, 30.6 grams of $\Delta^2$-cyclopentenyl chloride in 50 cc. of dry benzene was added dropwise over a period of three quarters of an hour. The reaction mass was then allowed to warm up to room temperature, and then refluxed for one hour. The solid material that separated was removed by suction filtration and the filtrate distilled under reduced pressure to remove the solvent. After a forerun of unreacted N,N-dimethyl - N' - ($\alpha$-pyridyl)-ethylenediamine the tertiary amine was distilled off between 173–176° C./10 mm. The yield was 27.5 grams (39%).

The mono-hydrochloride of this compound was prepared by dropping a solution of 4.2 grams of dry HCl in 25 cc. of ethyl acetate into a cold solution of 27.5 grams of N,N-dimethyl-N'-($\Delta^2$-cyclopentenyl)-N'-($\alpha$-pyridyl)-ethylenediamine in 25 cc. of ethyl acetate. On cooling, the hydrochloride of this compound crystallized out. The yield obtained was 28.5 grams (90%). The crude hydrochloride was recrystallized from ethyl acetate, and was found to have a melting point of 163–165° C. (with decomposition). The analysis calculated for this hydrochloride ($C_{14}H_{21}N_3$·HCl) was HCl 13.48%. Actually found, HCl 13.31%.

Example 2

The compound N,N-dimethyl-N'-(phenyl)-N'-($\Delta^2$ - cyclopentenyl) - ethylenediamine was prepared according to the procedure described in Example 1, except that N,N-dimethyl-N'-(phenyl)-ethylenediamine was substituted for the N,N - dimethyl-N'-($\alpha$-pyridyl) - ethylenediamine. After a forerun of unreacted N,N-dimethyl-N'-(phenyl)-ethylenediamine, the tertiary amine distilled off as a yellow viscous oil.

The monohydrochloride was prepared according to the procedure given in Example 1. On recrystallization from ethyl acetate, colorless crystals of the hydrochloride were obtained.

Example 3

The compound N,N-diethyl-N'-($\Delta^2$-cyclopentenyl)-N'-($\alpha$-pyridyl)-ethylenediamine, and the hydrochloride thereof, may be prepared according to the procedure described in Example 1 except for the use of N,N-diethyl-N'-($\alpha$-pyridyl)-ethylenediamine.

Having fully described my invention, what is claimed as new is:

1. A composition of matter having the general formula:

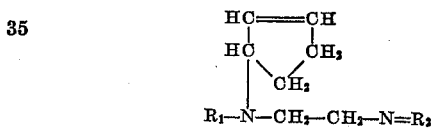

wherein $R_1$ is a radical from the group consisting of pyridyl and phenyl, and $R_2$ is selected from the group consisting of dimethyl, diethyl, and methyl ethyl.

2. Salts of the compounds called for in claim 1.

3. N,N-dimethyl-N' - ($\Delta^2$- cyclopentenyl) - N'-($\alpha$-pyridyl)-ethylenediamine.

4. N,N-dimethyl-N' - ($\Delta^2$ - cyclopentenyl) - N'-(phenyl)-ethylenediamine.

5. A process for preparing the compound of claim 1 which comprises reacting an alkali metal salt, of a compound having the general formula:

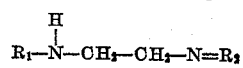

wherein $R_1$ is a radical from the group consisting of pyridyl and phenyl, and $R_2$ is selected from the group consisting of dimethyl, diethyl, and methyl ethyl, with $\Delta^2$-cyclopentenyl chloride.

6. A process for preparing the compound of claim 3 which comprises reacting an alkali metal salt of N,N-dimethyl-N'-($\alpha$-pyridyl)-ethylenediamine with $\Delta^2$-cyclopentenyl chloride.

7. A process for preparing the compound of claim 4 which comprises reacting an alkali metal salt of N,N-dimethyl-N'-(phenyl)-ethylenediamine with $\Delta^2$-cyclopentenyl chloride.

8. The mono-hydrogen acid salts of N,N-dimethyl-N'-($\alpha$-pyridyl) - N' - ($\Delta^2$-cyclopentenyl)-ethylenediamine.

9. The mono-hydrogen halide salts of N,N-dimethyl-N'-($\alpha$-pyridyl) - N' - ($\Delta^2$-cyclopentenyl)-ethylenediamine.

10. The mono-hydrogen acid salts of N,N-dimethyl - N' - (phenyl) - N'-($\Delta^2$-cyclopentenyl)-ethylenediamine.

11. The mono-hydrogen halide salts of N,N-dimethyl - N' - (phenyl) - N' - ($\Delta^2$ - cyclopentenyl)-ethylenediamine.

MITCHELL F. ZIENTY.

No references cited.